3,182,003
MEANS FOR SUPPORTING FUEL ELEMENTS IN A NUCLEAR REACTOR
Arthur G. Thorp II, Pittsburgh, Thomas F. Widmer, Monroeville, and Erling Frisch, Pittsburgh, Pa., assignors to Westinghouse Electric Corporation, East Pittsburgh, Pa., a corporation of Pennsylvania
Filed Apr. 4, 1960, Ser. No. 19,760
5 Claims. (Cl. 176—78)

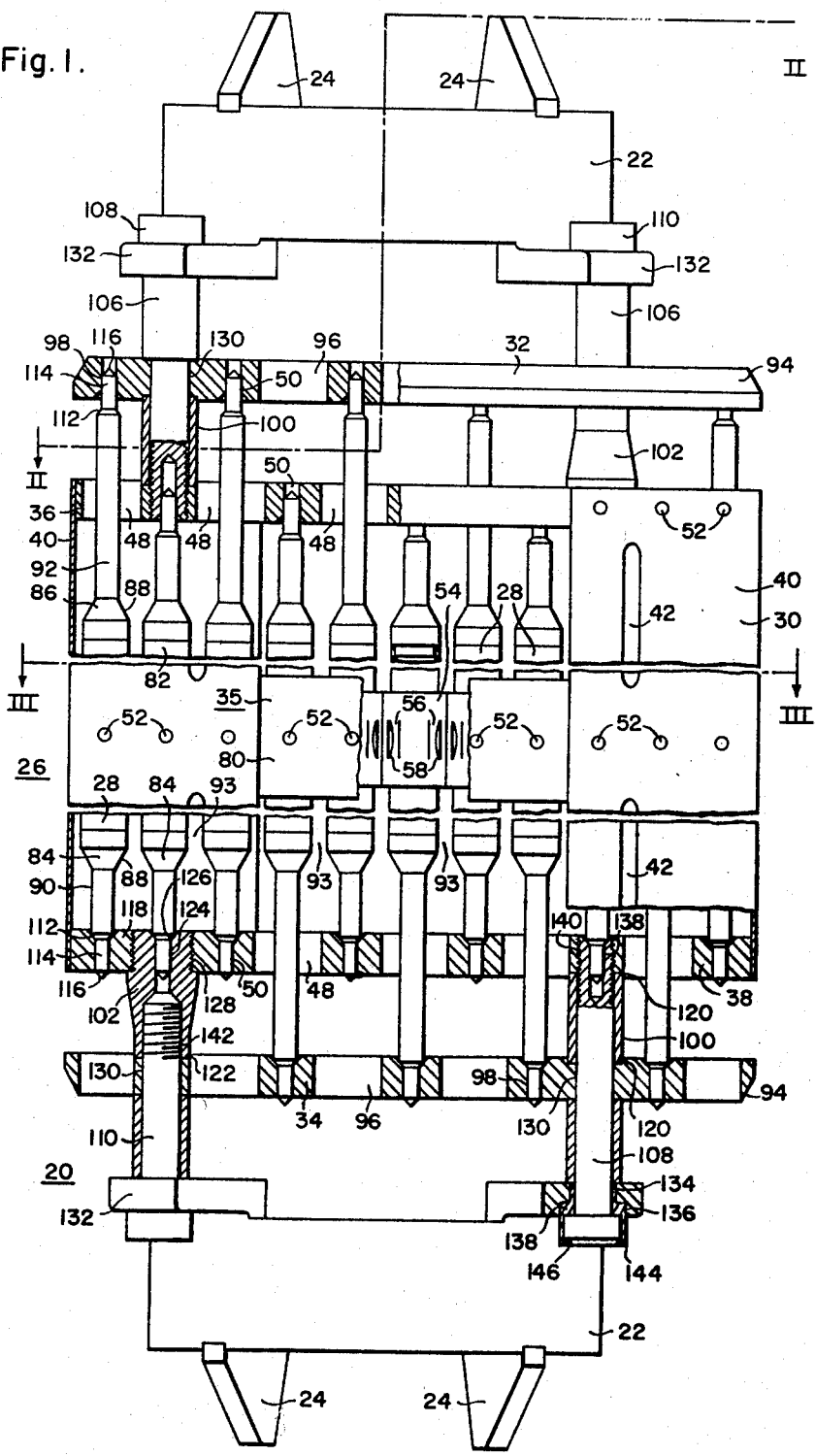
Fig. I.

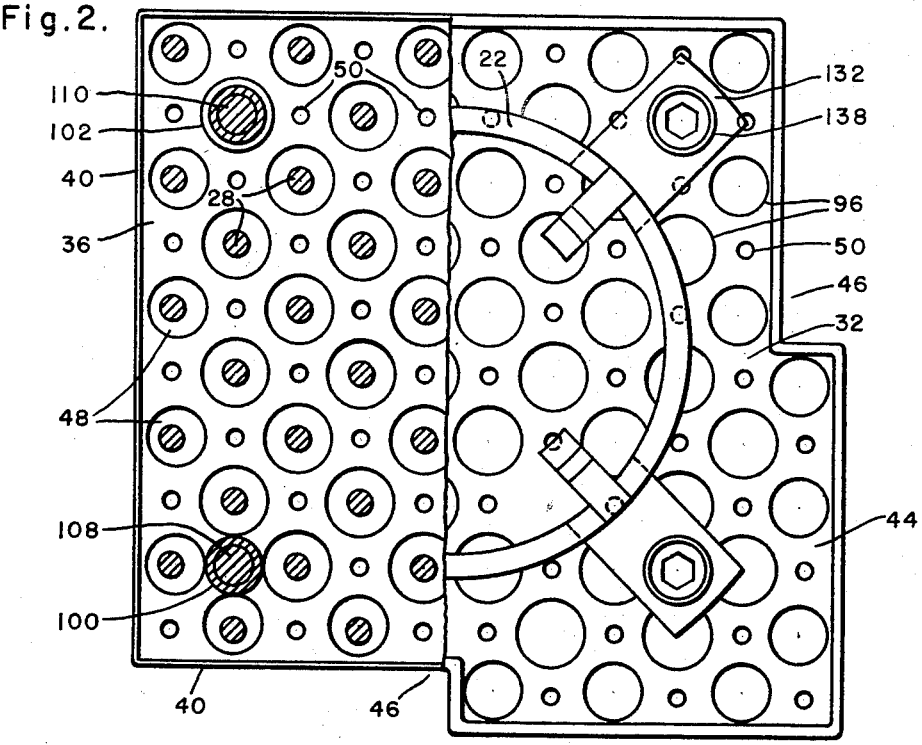
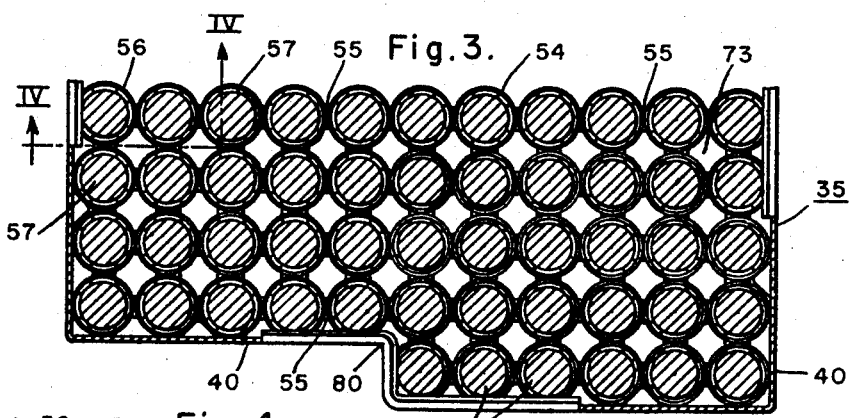
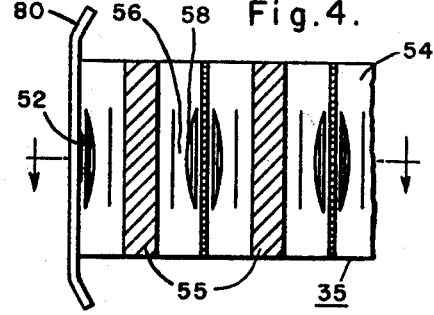
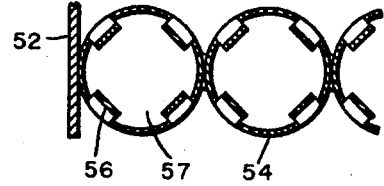

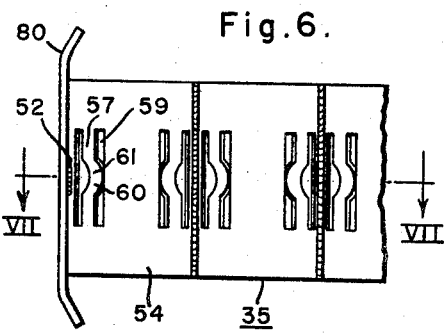
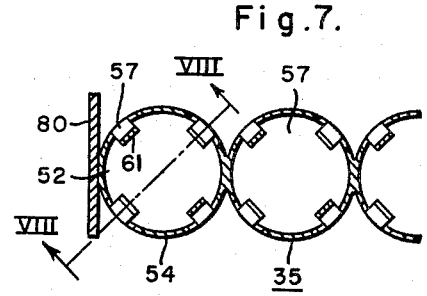
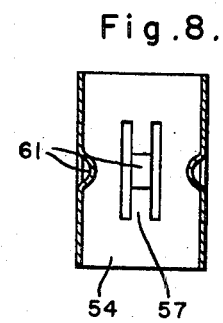
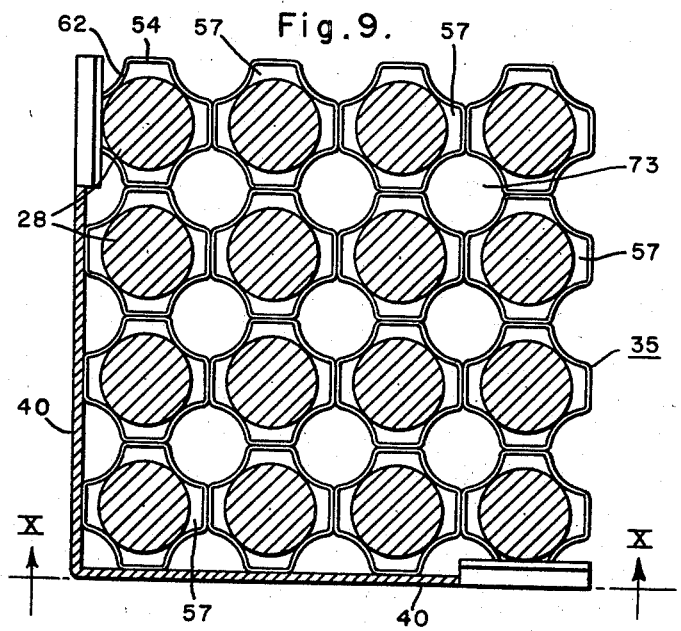
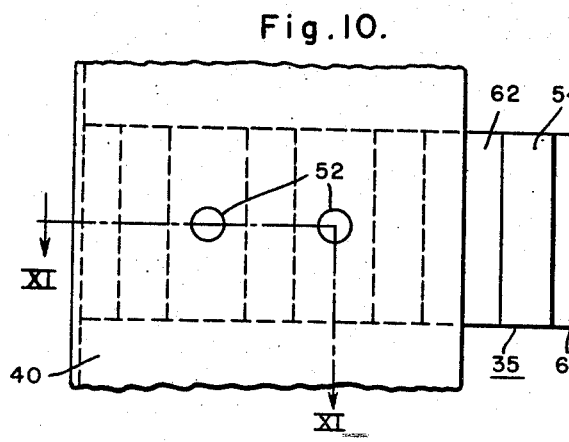
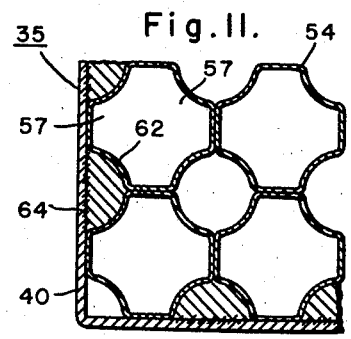

The present invention relates to nuclear reactors and more particularly to means for supporting elements bearing fissionable material or fuel in heterogeneous pressurized reactors of the neutronic type.

A fission nuclear reaction, which makes available considerable energy, can result when a fissionable atom captures a neutron having an energy level within a range of energy levels characteristically necessary for enabling fission to occur in the atom. With a suitable disposition of material containing fissionable atoms, a nuclear chain reaction can be sustained, such that, with the introduction of limitative or control means, successive generations of fissions substantially equal each other in number, even though each fission results in the release of two or three neutrons. The neutrons which are not employed for propagating the chain reaction reaction are accounted for as either escaping the reactive region in which the fissionable material is disposed or as being absorbed by fertile, control, or structural materials within the reactor. Of course, if desired, the escaping neutrons can be minimized in number by surrounding the reactive region with a material which characteristically is of high neutron reflective quality.

The chain nuclear reaction can be used for a variety of purposes, such as power generation or irradiation of test specimens. With reference to the former example, the chain reaction provides energy to be harnessed for beneficial use in other forms. For instance, the heterogeneous pressurized reactor has evolved as one type of arrangement for enabling the chain energy to be harnessed for beneficial use.

In the more specific case of the heterogeneous pressurized water reactor, a coolant in the form of water is circulated through the reactive region for the purpose of removing the produced energy in the form of heat for transfer through a heat exchanger or steam generator elsewhere in the circulatory system to operate a prime moving device, such as a turbine, and ultimately an electrical generator having an output of usable electrical energy. The reactive region conventionally includes an arrangement of fuel elements, such as an array of encased fuel formed from uranium dioxide. Once a nuclear reaction is initiated, its propagation as a chain reaction can be enhanced by using a suitable coolant such as water or certain organic materials which additionally serve to moderate or slow down emitted neutrons to fission-producing energy levels. The rate at which fissions occur can be directly controlled by the use of control rods or other members comprised of neutron-absorbing material, such as hafnium, and usually variably insertable within the reactive region or among the fuel elements.

The number of fuel elements which are used to form the reactive region is ordinarily determined by the critically necessary mass of the fissile material and by other considerations, such as the desired energy output and the allowable thermal character of the region. Conventionally, the fuel elements are formed into bundles or subassemblies, with the subassemblies being assembled or combined to form an overall assembly or the reactive region.

In the exemplified pressurized water reactor or, in fact, in most if not all neutronic reactors having substantially uniformly enriched cores, the neutron flux density varies within the reactive region as a function of coordinate position relative to the core structure. This is clearly so, for example, in that certain coordinate positions, such as those located centrally of the reactive or core region, are in greater proximity to a greater number of fissions and, therefore, have a statistically greater probability of being in the path of fission-producing neutrons. In locations in which elevated neutron flux is determined to exist, it can also reliably be correlated that the local heat generation of the adjacent fuel elements, in the case of the heterogeneous-type reactor, is relatively elevated because an elevated number of fissions and released energy is associated with the elevated neutron flux.

Thus, with continued reference to the exemplified pressurized water reactor, spaced fuel elements located within the same bundle or subassembly can experience different rates of heat generation and resulting differing rises in temperature. Moreover, such factors as flux peaking in adjacent water channels, unequal distribution of coolant flow through the core region, presence of adjacent structural material, xenon-tilt and other flux perturbations, also lead to the same effect. Accordingly, the spaced fuel elements respond with correspondingly different thermal expansions or contractions so that, unless means are provided for offsetting this thermal effect, the bundle can be subjected to deformation or bowing, which, in general, is undesirable since "hot spots" or regions of extreme temperature rise in the fuel elements can then result. An additional undesirable effect arises when peripherally located fuel elements bow to jam or obstruct control rod movement.

Conventional or rigid arrangements of fuel elements, regardless of the type of reactor in which they are employed, do not have the capacity to resolve properly the bowing problem as exemplified by reference to the pressurized water reactor. In certain applications, such as those in which the fuel elements are accorded a relatively small size, the bowing effect may, in fact, be neglectable depending upon design specifications. However, the fact remains that the bowing effect is objectionable in a considerable number of instances, particularly in those instances in which the size of the fuel elements is accorded a magnitude resulting in a relatively significant amount of bowing or other deformation.

Generally, means are normally provided for laterally supporting the fuel elements for reasons including that of precluding the occurrence of the aforementioned "hot spots." In fuel arrangements in which the bowing problem is resolved by providing for longitudinal or axial movement of the fuel elements, such as in a copending application of E. Frisch, Serial No. 19,851, entitled "Fuel Arrangement for a Nuclear Reactor," filed April 4, 1960, and assigned to the present assignee, or in other fuel arrangements which call for longitudinal or axial movement of the fuel elements for reasons other than those related to the bowing problem, it is desirable that the lateral supporting means function not only to support the fuel elements in defined lateral positions but also to enable the fuel elements to undergo axial movement relative thereto.

Thus, it is an object of the invention to provide novel means for supporting fuel elements in a fuel arrangement or assembly.

A further object of the invention is to provide novel means for laterally supporting fuel elements in a fuel assembly, including a grid-like member for laterally supporting the fuel elements yet for enabling axial movement of the same relative to the grid member.

Another object of the invention is to provide novel means for laterally supporting fuel elements in a fuel assembly, with the supporting means having low resistance to coolant flow.

It is an object of the invention to provide means for laterally supporting fuel elements in a fuel assembly, with the supporting means resiliently engaging the fuel elements against lateral displacement yet enabling the fuel elements to respond to applied thermal or other forces with axial movement relative to the lateral supporting means.

Still another object of the invention is to provide a grid member in the form of a plurality of integrated tubular elements so as respectively to support laterally the fuel elements of a fuel assembly yet, to enable the fuel elements to move axially relative to the grid.

More specifically, it is an object of the invention to provide a grid member in the form of a plurality of integrated tubular elements, with each of the tubular elements having spring portions, so as respectively to support laterally and resiliently each of the fuel elements of a fuel assembly, yet to enable the fuel elements to move axially relative to the grid.

These and other objects of the invention will become more apparent upon consideration of the following detailed description of several illustrative embodiments thereof as related to the attached drawings, in which:

FIGURE 1 is a front elevational view, being partially in section and having certain portions removed for clarity, of a fuel element arrangement constructed in accordance with the principles of the invention for a neutronic reactor;

FIG. 2 is a top plan view of the fuel element arrangement illustrated in FIG. 1, with portions of the arrangement also being removed here for clarity;

FIG. 3 is a partial sectional view taken along the reference line III—III of FIG. 1 to show a portion of a grid member included therewith.

FIG. 4 is an enlarged, partial sectional view taken along the reference line IV—IV of FIG. 3 to show in elevation a portion of the grid member illustrated in FIG. 3;

FIG. 5 is a sectional view taken along the reference line V—V of FIG. 4 to show in cross-section a portion of the grid member shown in FIG. 3;

FIG. 6 is a view similar to FIG. 4 and is illustrated here to show an alternate construction for the grid member;

FIG. 7 is a sectional view of the alternate construction shown in FIG. 6 taken along the reference line VII—VII thereof;

FIG. 8 is a sectional view taken along the reference line VII—VII of FIG. 7 to show a differing cross-section of the alternate grid-member of FIG. 6;

FIG. 9 is an enlarged cross sectional view similar to FIG. 3 and is shown here to illustrate another alternate construction for the grid member;

FIG. 10 is a partial view, taken along the reference line X—X of FIG. 9, of a fuel element arrangement similar to that of FIG. 1;

FIG. 11 is a sectional view taken along the reference line XI—XI of FIG. 10 to show an alternate means for securing the grid member of FIG. 9 to upstanding support members of a fuel element arrangement similar to that of FIG 1;

Figure 12:
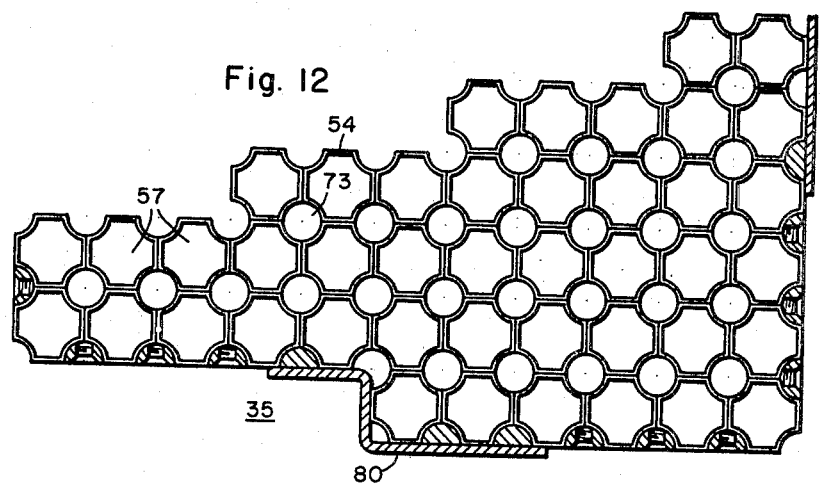
FIG. 12 is a plan view partially sectioned and similar to FIG. 9 of still another form for the grid member.
Figure 13:
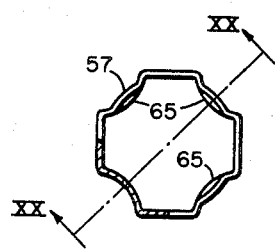
FIG. 13 is an enlarged top plan view, with portions removed of one of the elements of the grid of FIG. 12.
Figure 14:
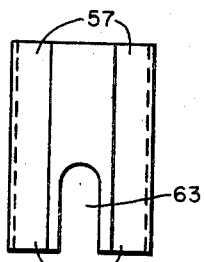
FIG. 14 is a front elevational view of the element shown in FIG. 13.
Figure 15:
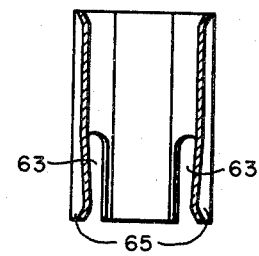
FIG. 15 is a sectional view of the element shown in FIG. 13 and taken along the reference line XV—XV thereof.

With reference to FIG. 1, a fuel element arrangement or subassembly 20 is provided for suspension between upper and lower core supporting plates (not shown) which are ordinarily provided in heterogeneous nuclear or neutronic reactors for the purpose of supporting a plurality of fuel element assemblies in forming the aforementioned reactive region or core. The reference core supporting plates ordinarily are in turn supported by conventional structural members of the reactor including, for example, a cylindrical supporting barrel (not shown).

The fuel element 20 includes oppositely positioned end nozzles 22 for engagement with the aforementioned core supporting plates through flow holes provided therein. In addition, the end nozzles 22 are provided with outwardly projecting lugs 24 for the purpose of enabling the fuel arrangement 20 to be handled through the use of tools. Between the end nozzles 22, means 26 are provided for supporting a plurality of fuel elements or rods 28 in the form of an array or a lattice.

In the embodiment of the invention shown in FIG. 1, the supporting means 26 include a frame member 30 and upper and lower retaining plates 32 and 34 for aiding in holding the fuel elements 28 substantially within the frame member 30. In addition, the supporting means 26 include means for laterally supporting the fuel elements 28 at points within the frame member 30, preferably comprising a grid-like member, or, as to be denoted here, a grid 35 integrally formed with the frame 30. A number of species of the grid 35 are shown in the various figures of the drawings.

The frame 30 is generally the basic structural framework of the fuel arrangement 20 and comprises upper and lower end plates 36 and 38 which provide for a transfer of cooling fluid along the fuel elements 28 and which, if desired, can also be used to position accurately the fuel elements 28 substantially within the frame 30. The frame 30 also comprises upstanding structural members or struts 40 which support the end plates 36 and 38 in spaced relation. As viewed in FIG. 2, the struts 40 are formed here as angled brackets so as to support the end plates 36 and 38 at their corners. If the struts 40 are formed from thin sheet material, or if otherwise desired, ribs 42 can be provided on the struts 40, in the upstanding direction for example, 40 to provide whatever rigidity is required for the same.

The material from which the frame 30 and other structural elements of the arrangement 20 can be formed is, for obvious reasons, desirably to be characterized with effective resistance to corrosion, suitable structural qualities, and a low neutron absorption cross section. As such, Zircaloy, an alloy of zirconium which is highly effective in transmitting rather than absorbing neutrons, can be employed, but, for economy purposes, it may be desirable that stainless steel, being of somewhat poorer neutron transmittal quality, be employed if the fuel inventory is suitably adjusted or if the quantity of material that is used is relatively minimized in amount so as to provide intended structural functions yet so as to provide an acceptably low overall amount of neutron absorption. For the reasons just considered and for economy purposes, it is desirable to form the struts 40 to be relatively thin, with the ribs 42 if necessary, when a material such as stainless steel is used. In any event, of course, the struts 40 must be formed so as to resist without significant deformation any compressive or buckling or bending stresses incurred during use.

The criteria for selecting the material for the end plates 36 and 38 will, of course, include the considerations just set forth. Generally, as viewed in FIG. 2, the end plates 36 and 38 are square in form with an offset portion 44 and with the resulting recesses 46 being employed as passages for control rods (not shown) when the arrangement 20 is positioned in the aforementioned core.

To provide the required amount of coolant flow determined through fluid transfer and thermodynamic considerations, a plurality of flow passages 48 are provided through the plates 36 and 38. In this application of the invention, the flow passages 48 are generally symmetrically located over the entire face of the end plates 36 and 38 in order to provide as much uniformity as possible in the coolant flow. The cross sectional area of the passages 48 is, of course, also determined in conjunction with other parameters such as the overall rigidity which is required for the end plates 36 and 38.

In addition, means can, if desired, be provided for engaging the adjacent ends of the fuel elements 28 and, if further desired, this means can be adapted for slidably engaging the adjacent ends of all or selected ones of the fuel elements 28. In this instance, the engaging means are provided in the form of recesses or channels 50 in the plates 36 and 38 for the purpose of receiving in guiding or sliding relation end portions of the fuel elements 28. Since the recesses or channels 50 also have a bearing upon the overall rigidity of the end plates 36 and 38, it follows that they also are necessarily taken into consideration in determining the required geometry of the plates 36 and 38. As will be described hereinafter and as already implied, the frame end plates can be provided with a form which does not include means for lateral holding of the fuel element ends.

Included with the frame 30, as viewed in FIG. 1, for attachment to the struts 40, is the grid 35 located substantially centrally of the struts 40, or a plurality of grids 35 spaced uniformly, if desired, along the upstanding direction of the struts 40, with the number of grids 35 being that which is determined to be necessary for laterally supporting the fuel elements 28. The grid or grids 35 are generally shaped to conform with the shape of the end plates 36 and 38 so as to be positionable in a lateral plane within the frame 30 for securance to the struts 40. It is to be noted that FIG. 1 includes the grid species shown in FIG. 3, but other grid species can just as well be employed.

In order to secure together the struts 40 and the grid or grids 35 and the end plates 36 and 38, any one of several means can be employed. For example, spot Heliarc welds can be employed, as indicated by the reference character 52. By this method, the adjoining surfaces to be integrated are brought into firm contact and an electric arc in a helium atmosphere is struck with the use of a special electrode holder. The arc causes confined melting of the metal of the adjoining surfaces at the point of contact with an excellent bond resulting after cooling. With accurate control of arc current and time of arc duration, sheet material can be welded satisfactorily within a relatively wide thickness range of the material. Perhaps more importantly, the resulting bond can be obtained with a minimum warping or bowing of the frame 30 relative to the amount of warping which might otherwise be occasioned. Of course, other methods of joining, such as spot welding, plug welding or brazing may be employed.

To provide a shield against control rod interference, guard members 80, as observed in FIGS. 1 and 3, can be bonded, as by Heliarc spot welding as indicated by the reference character 52, to the outer edges of the grid 35 between the struts 40 in the embodiment of the invention shown in FIG. 1.

Whichever bonding or other securing method is employed, the net effect is that the frame 30 can be provided with desired rigidity and with required straightness and squareness through the use of available machine tools and fixtures. It is to be noted that since the variation of neutron flux across the aforementioned core has negligible effect upon the temperature of the struts 40, which of themselves are not a heat source as are the fuel elements 28, the frame 30 has little or no tendency to warp or bow when placed in use.

The species of the grid 35 which is shown partially in FIG. 3 can be formed, with the aid of backing or supporting members (not shown) of ceramic or other heat resistant material, by welding or brazing together, as indicated by the reference character 55, relatively thin-walled tubular elements or ferrules 54 into rigid relation. The upstanding dimension of the ferrules 54 is determined so as to provide the required grid rigidity and also to enable lateral stabilizing forces, preferably resilient, of necessary magnitude to be provided for the fuel elements 28. The ferrules 54 are sized in cross section to provide openings 57 for the respective fuel elements 28. The fuel elements 28, which will subsequently be described more fully, are generally circular in cross section to conform generally with the cross section of the ferrule openings 57. Clearly, if fuel elements having different cross sectional forms are selected for use, corresponding cross sectional forms can be provided for the grid elements.

To provide resilient forces for laterally supporting and stabilizing the fuel elements 28, portions of the grid elements or ferrules 54 can be employed. As clearly observed in FIGS. 1, 3 and 4, arcuate spring-like portions or strips 56 can be deflected or curved inwardly of the ferrules 54 for point engagement with the fuel elements 28, thereby providing in this embodiment of the invention a resilient character for the resulting forces which stabilize the fuel elements 28. The spring strips 56 can be obtained by providing upstanding slits 58 in the ferrules 54 on each side of the strips 56. With the use of a plurality of the spring strips 56 about the inner periphery of the ferrules 54, the resilient forces resulting in an engagement of the grid 35 with the fuel elements 28 can be so directed and be of such magnitude as to provide the necessary lateral stability for the fuel elements 28.

Alternately, as viewed in FIGS. 6, 7 and 8, the necessary forces for resiliently engaging the fuel elements 28 can be obtained with the use of ferrule portions 57 having inwardly extending projections 60 and being adjoined by slots 59 extending in the upstanding direction. With this alternate lateral supporting means, the fuel element engaging forces, in effect, are concentrated to be imposed by an innermost and limited, inwardly curved or arcuate surface area 61 of the strip projections 60 in point engagement with the associated fuel elements.

Comprising another alternate lateral supporting means, the grid 35 can be formed of ferrules 54 with arcuate wall portions 62 thereof being curved or deflected inwardly to provide the preferred resilient forces for engaging the fuel elements 28 along line contacts. This arrangement is shown in FIGS. 9, 10 and 11. If desired, as viewed in FIG. 11, filler material, as indicated by the reference character 64, can be brazed or otherwise bonded between the ferrule portions 62 which are adjacent thereto in order to provide base material on the grid 35 for bonding of the same to the struts 40.

Another form comprising the lateral supporting means is depicted in FIGS. 12 through 15. Generally, this is another species of the grid 35 and is similar to the grid species just considered in connection with FIGS. 6 through 11. Here, however, slots 63 are employed adjacently to the ferrule portions 57 so that inwardly curved, arcuate tabs 65 are formed to provide the preferred resilient engaging forces for the fuel elements 28 along line contacts. The tabs 65 are deflected inwardly of the inner diameter of the tubular elements 54 so as to respond resiliently to fuel elements 28 located in the passages 57.

It is to be noted that the various species of the grid 35, here included in the embodied form of the aforementioned lateral supporting means, provide for accurately locating the fuel elements 28 and for laterally supporting and stabilizing the same, securingly or, as preferred, resiliently, against vibrational or other lateral movement. Thus, here the spring members 56 or 60 or 62 or 65 resiliently preclude any significant net movement of the fuel elements 28 laterally of their respectively defined positions. However, since only frictional restraint exists against unitary or differential axial movement of the fuel elements 28, such movement of the fuel elements 28 relative to the grid or grids 35 is enabled by the described resilient fuel element engagement.

In addition to functioning to engage the fuel elements 28, the grid 35 should not significantly impede the flow of coolant through the frame 30 and along the fuel elements 28. In connection with the latter consideration, the species of the grid 35 depicted in FIG. 3 or 6 or 9 or 12 is particularly suited for this purpose. Thus, flow holes 73 adequately allow for required coolant transfer through the fuel arrangement 20.

In furtherance of this purpose, the grid structures 35 of FIGS. 3, 6, 9 and 12 are arranged, in accordance with the invention, to provide, at most, line rather than area contacts with the respectively associated fuel elements 28. This arrangement introduces only a minimal impedance to fluid flow through the grid structures, and further, the use of line or point lateral engagement between the fuel elements 28 and the grid structures 35, rather than area engagement, minimizes the possibility of hot-spot formation in the heat-generating fuel elements.

More specifically, the grid structures 35 of FIGS. 3 and 6 afford only point contacts between their arcuate or curved portions 56 and 61, respectively, and the associated fuel elements. The latter portions are endowed with generally opposed curvature relative to that of the fuel rods 28 (i.e. curved away from the fuel elements) and since the axes of curvature of the portions 56 or 61 and of the fuel elements are disposed more or less perpendicularly to one another, only point contact ensues. The arcuate wall portions 62 of FIG. 9 and the arcuate tabs 65 of FIG. 12 are likewise of generally opposed curvature relative to that of the fuel rods 28 in that the portions 62 and the tabs 65 are curved away from the fuel elements. However, the respective arcs of curvature in these cases are more or less parallel, relative to the associated fuel elements, so that the grid structures of FIGS. 9 and 12 afford line contacts therewith.

To this point in the description, only general reference has been made to the fuel elements 28 and a more specific description of the same is now in order. Of course, the principal purpose of the fuel elements 28 is to dispose for heat exchange, as determined through design considerations, a quantity of fissionable material throughout the fuel arrangement 20 and, therefore, ultimately through the reactive region of the aforementioned core. In this instance, each of the fuel elements 28 is provided with an elongated cylindrical tube 82 which is formed from a cladding material, such as stainless steel, selected generally in accordance with the considerations previously set forth in connection with the selection of structural materials for the fuel arrangement 20. The elongated tube 82 is formed to receive a plurality of diametrically conforming, cylindrical pellets (not shown) of fissionable material. End plugs 84 and 86 are sealed hermetically to the open ends of the cylindrical tube 82 thereby to complete the fuel element 28 and to retain the inserted fuel pellets.

The end plugs 84 and 86 are tapered, as indicated by the reference character 88, to terminate, respectively, with relatively slender extensions 90 and 92. Thus, the entry or exit of coolant through the frame end plates 36 and 38 is minimally obstructed by the fuel element plugs 84 and 86 and is enabled to be distributed as uniformly as practically feasible into fluid channels 93 between adjacent fuel elements 28. The end plugs 84 and 86 can, if desired, be employed for engaging the fuel elements 28 with the frame 30.

The fuel arrangement 20 is also provided, as previously noted, with upper and lower retaining plates 32 and 34. The latter generally conform in size and shape to the upper and lower end plates 36 and 38 of the frame 30. To facilitate positioning of the fuel arrangement 20 within the aforementioned core, a beveled peripheral portion 94 is provided on the retaining plates 32 and 34. The retaining plates 32 and 34 are also provided with coolant passage 96 and, if desired, means or recesses or channels 98 for engaging the fuel element end plugs 86.

The end plugs 86, being observably longer than the end plugs 84, extend through coolant passages 48 of the end plates 36 and 38, here for engagement with the retaining plate 32 or 34 in the channel 98. As viewed in FIG. 1, the coolant passages 96 in the retaining plates 32 and 34 are laterally offset from the coolant passages 48 in the end plates 36 and 38. Thus, to obtain uniform flow it is particularly desirable that the retaining plates 32 and 34 be spaced from the end plates 36 and 38, respectively. Spacers 100 and 102 are provided for this purpose.

Similarly, the end nozzles 22 are positioned in spaced relation to the retaining plates 32 and 34 through the use of spacers 106 for the purpose of obtaining uniform fluid flow. To secure the end nozzles 22 and the retaining plates 32 and 34 with the frame 30, bolts 108 and 110 are provided.

In connection with assembling the exemplified fuel arrangement 20, the frame 30 can first be formed in the manner previously described, and it is only necessary then that the fuel elements 28 be guided through the frame plate passages 48, through aligned passages 57 in the gid or grids 35 so that the end plugs 84 are engaged with the adjacent end plate engaging means or channels 50. It is to be noted that to effect the preceding operation, the coolant passages 48 of the frame plate 36 or 38 are aligned, respectively, with the recesses 50 of the plate 38 or 36.

Relative to the exemplified engagement of the fuel elements 28 with the plates 36 and 38, it is to be noted as being a sliding one in which lateral motion of the fuel elements 28 is substantially precluded and in which longitudinal motion of the same is enabled at least to a limited extent. Thus, the fuel element extensions 90 are provided with a beveled portion 112 for limiting movement of the fuel elements 28 against the end plates 36 or 38, and an end portion 114 for sliding movement in the end plate channels 50. The end portions 114 are provided with a nose 116 for facilitating entry of the fuel elements 28 into the end plate channels 50, and as a corollary, the plate channels 50 are enlarged with the use of a beveled portion 118 for the same purpose and, in addition, for engaging the fuel element beveled portion 112 in limiting the insertional or longitudinal or axial movement of the fuel elements 28. If desired, the noses 116 can be split longitudinally (not shown) to provide resilient forces for ensuring the preclusion of vibratory motion of the ends of the fuel element 28.

If the frame 30 is formed before the fuel elements 28 are engaged therewith, the fuel elements 28 are inserted alternately through the end plates 36 and 38 so that, when fully inserted and engaged by the end plate channels 50, the fuel element plug extensions 92 are free so as to project through the aligned end plate passages 48. The end plug extensions 92 are also provided with a beveled portion 112 and a projection 114 having a nose 116 for purposes already considered. When partially assembled as thus far described, the fuel arrangement 20 includes the frame 30 and the array of positioned fuel elements 28, with alternate fuel elements 28 having their end plugs 86 projecting through the frame end plates 36 and 38, respectively.

To continue with the assembly description, the retaining plates 32 and 34 are positioned over the projecting end plugs 86 such that the plug projections 114 are guided into the retaining plate engaging means or channels 98. Of course, the spacers 100 and 102 are appropriately positioned between the end plates 36 and 38 and the retaining plates 32 and 34, respectively. To index the spacers 100 against lateral movement relative to the end plates 36 and 38 and the retaining plates 32 and 34, detents 120 are provided in the end and retaining plates 32, 34, 36 and 38 for receiving the spacers 100. A detent 122 is also provided in the retaining plates 32 and 34 for laterally indexing the spacers 102. To secure the spacer 102 to the end plates 36 or 38, a threading engagement, as indicated by the reference character 128, can be employed.

The reason for the structural differences between the spacers 100 and 102 is founded on the fact that the spacer 100 is superposed over what would normally be a channel 50 in the end plate 36 or 38. On the other hand, the spacer 102 is superposed over what would normally be a flow passage 48 in the end plate 36 or 38 and is provided with a centrally located recess 124 having a beveled portion 126 to provide means for engaging the adjacent fuel element end plug 84 in a manner similar to that provided through the use of the channels 50 in the end plates 36 and 38. In connection with the latter consideration, it is to be noted that the fuel elements which are located adjacently to the spacers 102 are provided with a pair of end plugs 84 rather than one end plug 84 and one end plug 86 so as to provide for accommodating the spacer 102.

A channel 130 is provided through the retaining plates 32 and 34, to be aligned with each of the spacers 100 or 102, for the purpose of allowing passage of the securing bolts 108 and 110. The annular spacers 106 are placed adjacently to the retaining plate openings 130 and the end nozzles 22 are in turn, placed upon the spacers 106.

In connection with the latter step, it is to be noted that the end nozzles 22 are provided with mounting lugs 132 having passages 134 for the bolts 108 and 110. The passages 134 have an enlarged portion 136 in order to provide for supporting an annularly shaped retainer or bushing 138. To secure the fuel arrangement 20 in assembled form, the bolts 108 and 110 are inserted through the nozzle lugs 132 and the retaining plates 32 and 34 for securance with the frame end plates 36 and 38.

Thus, the bolts 108 and 110 are inserted through the bushings 136 and the nozzle mounting lugs 132, through the spacers 106 and through the retaining plate passages 130 into the spacers 100 or 102. The bolts 108 are then threadedly engaged with the end plate 36 or 38 and, being provided with a recess 138 which is enlarged with a beveled portion 140, serves to engage the end projection 114 of the adjacent fuel element 28. Of course, what would ordinarily be a channel 50 in the end plate 36 or 38 is necessarily enlarged to provide the related threaded engagement of the bolts 108 with the end plate 36 or 38. The bolts 110 are threadedly engaged with the spacers 102, which are threadedly secured to the end plates 36 and 38, and for this purpose a recess 142 with peripheral threading is provided in the spacers 102. When the frame 30 and the retaining plates 32 and 34 and the end nozzles 22 are fully secured together by a tightening of the bolts 108 and 110, staking portions 144 of the bushings 134 can be deformed to overlie bolt portions 146, beveled if desired, so as to retain the bolts 108 and 110 in their tightened position.

Clearly, the final form of the fuel arrangement 20 is one characterized with considerable rigidity against thermal, fluid, mechanical and other environmental forces. Nevertheless, the fuel elements 28 can be differentially altered in longitudinal dimension substantially without deforming or bowing the arrangement 20. As has already been set forth, lateral supporting means comprising the grid or grids 35 are arranged so that the fuel elements 28 are stabilized against lateral motion through the use here of resilient engaging forces but relatively free to move longitudinally of the grid or grids 35.

For a more thorough description of the fuel arrangement 20 and other similar arrangements and of the considerations relevant to the problem of bowing, reference is made to the aforementioned copending application.

Figure 16:
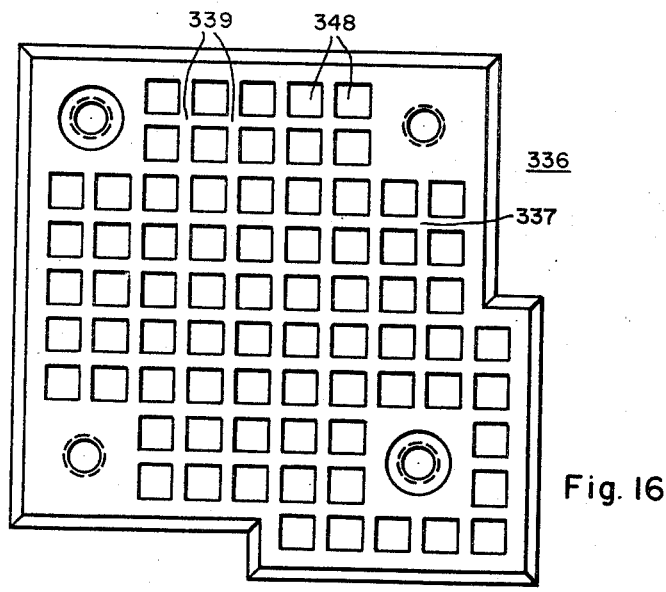
FIG. 16 is a plan view of an alternative end plate that can be employed with the fuel arrangement of FIG. 1; and, FIG. 17 is a cross sectional view which is taken along the reference line XVII—XVII of FIG. 16 to show the relation of the end plate to adjacent fuel elements when employed as just related.

As described in the aforementioned copending application, plates 336, as viewed in FIG. 16, can be employed to form the ends of the frame 30 of FIG. 1. The plates 336 include a grid network 337 which forms a plurality of fluid flow passages 348 and a plurality of intersecting portions 339 serving as abutments to limit movement of the fuel element 28 and to retain the same within the frame 30. Of course, if the plates 336 are employed with the frame 30, appropriate structural modifications in the arrangement 20, particularly removal of the retaining plates 32 and 34, would logically be made.

Figure 17:
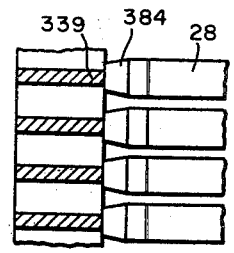

FIG. 17 is presented to illustrate the relation between the fuel elements 28 and one of the plates 336 when employed with the frame 30 of FIG. 1. As shown, the ends of the fuel elements 28 are, in this instance, provided with relatively short end plugs 384. With the fuel elements 28 having resilient lateral support from a plurality of grids 35, and with the fuel elements 28 being slightly shorter than the distance between the plates 336, differential or unitary longitudinal movement of the fuel elements 28 is clearly enabled. Thus, the equilibrium position of the fuel element 28, shown here to be against the one plate 336, is the result of resolving all the forces applied thereto, with the movement being limited in extent by the plate intersecting portions 339. Of course, the fuel elements 28 are, in this example, inserted within the frame 30 prior to final placement of at least one of the plates 336.

In the foregoing description, several arrangements or combinations including lateral supporting means for fuel elements have been fully illustrated and described to point out distinctly the principles of the invention. The description, however, is intended only for the purpose of clearly illustrating and exemplifying these principles of the invention, and, accordingly, it is desired that the invention be not limited by the embodiments described here, but, rather, that it be accorded an interpretation consistent with the scope and spirit of its broad principles.

What is claimed is:

1. In a reactor fuel arrangement having a frame member, a plurality of elongated fuel rods supported by said frame member, means for laterally supporting said fuel rods, said lateral supporting means being supported at least partially by said frame member and including a grid formed from a lateraly extending layer of tubular elements, means for rigidly joining each of said tubular elements to the outer surfaces of adjacent tubular elements to form a rigid unitary structure for said grid, said fuel rods extending through said tubular elements respectively, and said tubular elements each having arcuate spring means of generally opposed curvature relative to that of said rods for resiliently engaging the associated one of said fuel rods along at most a line contact and for holding said fuel rods against lateral movement relative to each other and to said frame but enabling differential longitudinal movement of said fuel rods relative to said tubular elements and to one another.

2. In a reactor fuel arrangement having a frame member, a plurality of elongated fuel rods supported by said frame member, means for laterally supporting said fuel rods, said lateral supporting means being supported at least partially by said frame member and including a grid formed from a laterally extending layer of tubular elements, means for rigidly joining each of said tubular elements to the outer surfaces of adjacent tubular elements to form a rigid unitary structure for said grid, said fuel rods extending through said tubular elements respectively, and said tubular elements each having an arcuate resilient portion thereof of generally opposed curvature relative to that of said rods and deformed inwardly for resiliently engaging the associated one of said fuel rods along at most a line contact and for holding said rods against lateral movement relative to each other and to said frame but enabling differential longitudinal movement of said fuel rods relative to said tubular elements and to one another.

3. In a reactor fuel arrangement having a frame member, a plurality of elongated fuel rods supported by said frame member, means for laterally supporting said fuel rods, said lateral supporting means being supported at least partially by said frame member and including a grid formed from a laterally extending layer of tubular elements, means for rigidly joining each of said tubular elements to the outer surfaces of adjacent tubular elements to form a rigid unitary structure for said grid, said fuel rods extending through said tubular elements respectively, and said tubular elements each having an arcuate resilient strip portion of generally opposed curvature relative to that of said rods and deformed inwardly thereof for resiliently engaging the associated one of said fuel rods along at most a line contact and for holding said rods against lateral movement relative to each other and to said frame but enabling differential longitudinal movement of said fuel rods relative to said tubular elements, at least some of said strip portions having a projection extended further inwardly of the associated tubular elements to concentrate the resilient forces of said some strip portions.

4. In a reactor fuel arrangement having a frame member, a plurality of elongated fuel rods supported by said frame member, means for laterally supporting said fuel rods, said lateral supporting means being supported at least partially by said frame member and including a grid formed from a laterally extending layer of tubular elements fabricated from a resilient material, means for rigidly joining each of said tubular elements to the outer surfaces of adjacent tubular elements to form a rigid unitary structure for said grid, said fuel rods extending through said tubular elements respectively, and said tubular elements each having a sector thereof deformed inwardly thereof, said tubular elements each having longitudinally extending slots disposed adjacent each side of said deformed sector, and the portions of each of said sectors adjacent said slots being deformed arcuately and further inwardly into a shape having a curvature generally opposed to that of said rods for resiliently engaging the asociated one of said fuel rods along at most a line contact and for holding said fuel rods against lateral movement relative to each other and to said frame member but enabling differential longitudinal movement of said fuel rods relative to said tubular elements and to one another.

5. In a reactor fuel arrangement having an elongated frame member, a plurality of elongated fuel rods supported by said frame member, means for laterally supporting said fuel rods, said lateral supporting means being supported at least partially by said frame member and having a laterally extending layer of cell-like apertures, each of said apertures being circumscribed by a wall portion of said lateral supporting means, said fuel rods extending through said apertures respectively, and each of said wall portions having arcuate spring means of generally opposed curvature relative to that of said rods resiliently engaging the associated one of said fuel rods along at most a line contact for holding said rods against lateral movement relative to each other and to said frame member but enabling differential longitudinal movement of said fuel rods relative to said lateral supporting means and to one another, and said frame member having plate means secured adjacent each end thereof, said plate means having parallel crossed bars disposed so as to provide a plurality of fluid flow passages laterally displaced from the adjacent ends of said fuel rods and a plurality of abutment portions adjacent said fuel rod ends respectively, said plate means being spaced by said frame member a distance slightly greater than the length of said fuel rods to afford only limited longitudinal movement thereof.

References Cited by the Examiner
UNITED STATES PATENTS

| | | | |
|---|---|---|---|
| 2,505,695 | 4/50 | Billiger. | |
| 2,886,503 | 5/50 | Szilard | 176—64 |
| 2,524,517 | 10/50 | Cole | 211—73 X |
| 2,598,492 | 5/52 | Boes | 211—73 X |
| 2,741,913 | 4/56 | Dovas | 211—69 X |
| 2,778,792 | 1/57 | Szilard | 176—30 X |
| 2,863,815 | 12/58 | Moore | 176—29 |
| 2,975,117 | 3/61 | Zinn | 176—18 |
| 2,990,359 | 6/61 | Wyman | 176—81 |
| 2,992,982 | 7/61 | Avery | 176—17 |
| 2,999,059 | 9/61 | Treshow | 176—42 |

FOREIGN PATENTS

| | | |
|---|---|---|
| 671,375 | 5/52 | Great Britain. |
| 784,890 | 10/57 | Great Britain. |
| 785,928 | 11/57 | Great Britain. |
| 822,790 | 10/59 | Great Britain. |

CARL D. QUARFORTH, *Primary Examiner.*

LEON D. ROSDOL, REUBEN EPSTEIN, ROGER L. CAMPBELL, *Examiners.*